(12) United States Patent
Dorresteyn et al.

(10) Patent No.: US 11,577,798 B2
(45) Date of Patent: Feb. 14, 2023

(54) LOCKING DEVICE FOR ELECTRIC MOTORCYCLE

(71) Applicant: Damon Motors Inc., Vancouver (CA)

(72) Inventors: Derek Dorresteyn, Bowen Island (CA); Reto Karrer, Durnten (CH)

(73) Assignee: Damon Motors Inc., Vancouver (CA)

( * ) Notice: Subject to any disclaimer, the term of this patent is extended or adjusted under 35 U.S.C. 154(b) by 34 days.

(21) Appl. No.: 17/495,111

(22) Filed: Oct. 6, 2021

(65) Prior Publication Data

US 2022/0048584 A1 Feb. 17, 2022

Related U.S. Application Data

(60) Provisional application No. 63/064,585, filed on Aug. 12, 2020.

(51) Int. Cl.
*B62H 5/08* (2006.01)

(52) U.S. Cl.
CPC ...................................... *B62H 5/08* (2013.01)

(58) Field of Classification Search
CPC ......... B62H 5/08; B62H 5/12; F16H 63/3416; F16H 63/3433
See application file for complete search history.

(56) References Cited

U.S. PATENT DOCUMENTS

| 1,564,220 | A | * | 12/1925 | Dumas | B60R 25/007 70/247 |
|---|---|---|---|---|---|
| 4,329,953 | A | * | 5/1982 | Row | B62H 5/08 70/186 |
| 7,694,795 | B2 | * | 4/2010 | Berger | F16H 63/3475 192/219.5 |
| 7,861,839 | B2 | * | 1/2011 | Schweiher | F16H 63/483 74/473.26 |
| 11,022,218 | B2 | * | 6/2021 | Schwegler | F16H 63/3483 |
| 2020/0332894 | A1 | | 10/2020 | Gebert et al. | |
| 2020/0354005 | A1 | * | 11/2020 | Jauch | F16H 63/3416 |
| 2021/0148464 | A1 | * | 5/2021 | Kimura | F16H 63/48 |

FOREIGN PATENT DOCUMENTS

| CN | 105416443 | 3/2016 |
|---|---|---|
| CN | 106892026 | 6/2017 |
| CN | 107140066 | 9/2017 |
| DE | 102014204742 | 9/2015 |
| KR | 101674814 | 11/2016 |
| WO | 2019/07452 | 1/2019 |

\* cited by examiner

*Primary Examiner* — Kevin Hurley
*Assistant Examiner* — Harold Eric Pahlck, III
(74) *Attorney, Agent, or Firm* — Damien G. Loveland

(57) ABSTRACT

A locking system is used to safely immobilize electric motorcycles. The system involves a pin-based locking device that can be activated by the user via a key, remote and/or a switch located on the dashboard of the electric motorcycle. The locking device engages the pin with a component that is rotated by the transmission of the electric motorcycle. When activated, the locking device locks the transmission and prevents the motorcycle from being subjected to unwanted driving wheel rotation.

23 Claims, 4 Drawing Sheets

LOCKING DEVICE FOR ELECTRIC MOTORCYCLE

TECHNICAL FIELD

This application relates to a locking device used to stabilize an electric motorcycle while parked. More specifically, it relates to a locking device that prevents an electric motorcycle from unwanted driving wheel rotation.

BACKGROUND

Electric motorcycles, having a lack of an internal combustion engine coupled to a sequential transmission, are prone to unwanted motion and potential tipping over when parked on an inclination. In the traditional combustion engine motorcycle, the act of leaving the motorcycle parked while in a low gear is generally sufficient to stop unwanted motion of the vehicle even on an inclination. Electric motorcycles, due to the general low rotational resistance of an electric motor and the lack of selectable gears, have little resistance to unwanted wheel rotation or motion while parked, and this can result in injury and/or property damage.

A standard practice for the majority of motorcycles sold today is the steering lock, irrespective of whether they have internal combustion engines or are electric. A steering lock requires the motorcycle's front steering axis to be rotated at approximately 30 degrees and locked in place by a pin. This system is clumsy, and in some situations, makes the vehicle more unstable while parked. In addition, the steering lock system requires the use of a key. Another solution is to fit a cable-actuated second caliper onto the rear brake with related actuation.

This background information is provided to reveal information believed by the applicant to be of possible relevance to the present invention. No admission is necessarily intended, nor should be construed, that any of the preceding information constitutes prior art against the present invention.

SUMMARY OF INVENTION

A locking device locks the electric motorcycle in place and prevents movement with a result similar to the use of a parking brake in an automobile, but does it with a mechatronic lock or locking device that engages with a rotatable component in or connected to the motor transmission unit of the electric drive. The integration of the locking device with the vehicle protects against tampering as well as allowing safety checks and automation to be performed in relation to the locking function. The locking device may also be implemented without the use of a mechanical key. The locking device may also be used on motorcycles with an internal combustion engine.

This summary does not necessarily describe all features of the invention.

Disclosed is a system for immobilizing an electric motorcycle, comprising: a rotatable component that is driven by a transmission of the electric motorcycle, the rotatable component having a plurality of locating features; and a pin that is movable from a first position in which the pin is disengaged from the locating features to a second position in which the pin is engaged with one of the locating features, thereby immobilizing the electric motorcycle.

In some embodiments, the system includes a locking component of which the pin is a part, the locking component comprising a body from which the pin extends; a first spring that biases the pin towards the first position; an actuator; an actuator pin operated by the actuator; a second spring positioned to allow relative motion between the locking component and the actuator pin; and a latch that is operated by the actuator and a third spring to retain the pin in the first position when the pin is in the first position. In some embodiments, each of the locating features is formed by two adjacent teeth on the rotatable component.

Also disclosed is a method for immobilizing an electric motorcycle comprising: providing a rotatable component that is driven by a transmission of the electric motorcycle, the rotatable component having a plurality of locating features; and moving a pin from a first position in which the pin is disengaged from the locating features to a second position in which the pin is engaged with one of the locating features, thereby immobilizing the electric motorcycle.

BRIEF DESCRIPTION OF DRAWINGS

The following drawings illustrate embodiments of the invention, which should not be construed as restricting the scope of the invention in any way.

DESCRIPTION

A. Exemplary Embodiment

Figure 1:
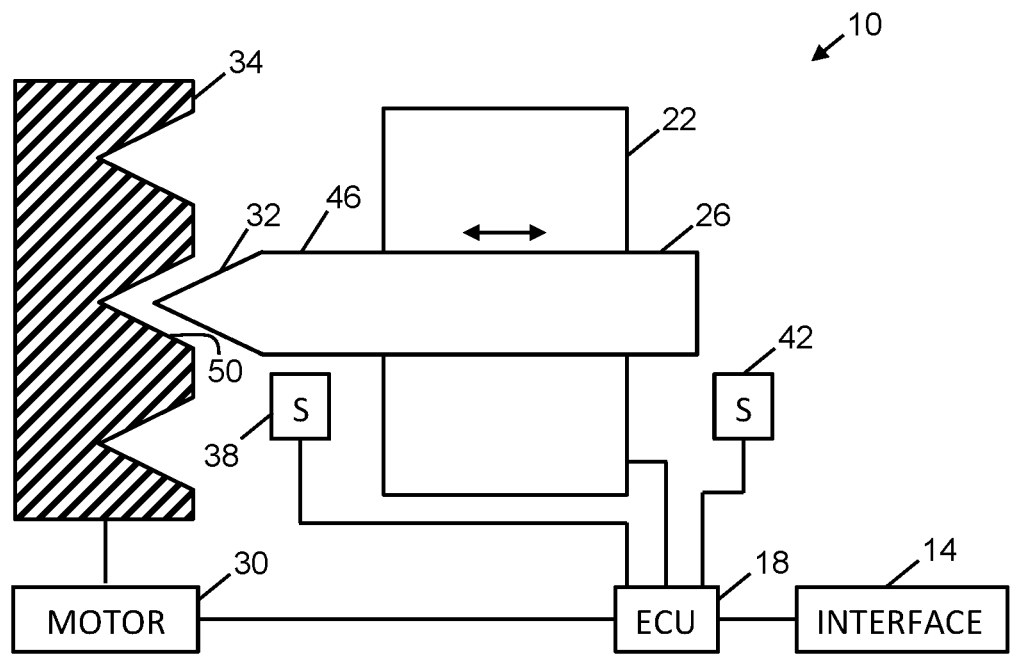
FIG. 1 is a combination of a schematic drawing and a block diagram of the locking device according to an embodiment of the present invention.

Referring to FIG. 1, the user activates the system or locking device 10 by pushing a designated button, for example, on the interface 14 or dashboard of the electric motorcycle. The locking device 10 is designed for electric motorcycles in order to provide a parking brake. The locking device 10 is made to hold the motorcycle with, for example, a 250 kg mass in position on a 25% inclination. The interface 14 sends a signal to an engine control unit or ECU 18. The ECU 18 then triggers and controls a servo motor or stepper motor in the actuator 22 that implements the movement of the locking pin 26.

The ECU 18 is connected to the main drive motor 30 of the electric motorcycle. The motor 30 is responsible for the rotation of a component, such as a reduction gear 34, of the transmission of the electric motorcycle. When the locking device 10 is in the locked configuration, the motor 30 does not activate the transmission and the locking pin 26 prevents the transmission from moving. Conversely, when the motor is driving the transmission and the motorcycle is moving, the ECU 18 prevents activation of the locking system.

An off-the-shelf stepper motor screw type actuator 22 pushes the locking pin 26, which may be an aluminum pin with a tapered end 32, into serrated features or recesses 50 machined into the reduction gear 34, which is part of the transmission, or other component on the electric motor rotor shaft, locking the motor 30 and the entire motorcycle drive and rear wheel in place.

The system has, for example, two inductive sensors 38 and 42 positioned in such a way that they provide a confirmation or not that the locking pin 26 is locked into place to lock the transmission. One inductive sensor 42 is positioned at the back or rear section of the locking device 10. In relation to this figure, the term "back" or "rear" relates to the end of the locking pin 26 distal from the reduction gear 34. The rear inductive sensor 42 detects the absence of the back end of the locking pin 26 when the actuator 22 pushes the locking pin into the recess 50, while the front inductive sensor 38 detects the presence of the front end 46 of the locking pin when it is engaged with the reduction gear 34. The inductive sensors 38, 42 are placed so that the position of the locking pin 26 is confirmed as "in" or "out", or, correspondingly, engaged or disengaged. In some embodiments, the sensors are located differently depending on the arrangement and the setup of the locking device 10 and its locking pin 26. When the end tip 32 of the locking pin 26 reaches the recess 50 located on the reduction gear 34 in the transmission, the sensor 38 detects the position of the front end 46 and sends a signal to the ECU 18, which stops the movement of the actuator 22. Sensor 42 detects the absence of the locking pin and sends a signal to the ECU 18 for confirmation.

In some embodiments, the sensors 38 and 42 are Hall effect sensors or switch sensors. In some embodiments, other types of sensor may be used. In some embodiments, only one sensor is used to determine the position of the locking pin 26 instead of the two sensors 38 and 42.

In some embodiments, the electro-mechanical implementation of the locking system can utilize a servo or stepper control with an additional position sensing capability. In some embodiments, instead of inductive sensors 38 and 42, an absolute encoder in the actuator 22 is used to sense the position of the locking pin 26. As such, the actuator can provide feedback of the position of the locking pin 26 to the ECU 18.

In some embodiments, the recesses 50 are located on any other rotating component of the electric motorcycle connected directly or indirectly to the motor or transmission. In some embodiments, the locking pin 26 engages in a rotatable element in an electric, internal combustion, or related gearbox, as long as it is after (downstream of) the clutch. In some embodiments, the locking pin 26 engages in a shaft of the transmission. In some embodiments, the locking device 10 is integrated with a gear that has a fixed connection to the rear wheel of the electric motorcycle. The advantage of having the locking device 10 engaging with a reduction gear instead of the shaft is that the reduction gear option provides a more compact integration, as the relatively long motor/shaft actuator assembly can be parallel to the motor rotor or any related shafts.

The locking pin 26 is made from a softer material than the heat-treated alloy steel of the transmission component with which it engages. The locking pin 26 design is such that in the worst case a portion of it will shear off rather than allowing the transmission component to suffer damage. The locking pin 26 is therefore sacrificial in case of unintended actuation, but still sufficiently robust to resist expected forces encountered in normal use.

When the actuator 22 stops, after engaging the pin 26 in a recess 50, a light on the dashboard or interface 14 is activated as a result of the information being broadcast on the CAN bus by the ECU 18. This light indicates that the locking device 10 is ON or in locked configuration and furthermore that the electric motorcycle is in a safely parked mode. Conversely, when the actuator 22 stops, after retracting the pin 26 from a recess 50, this information is also broadcast to the motorcycle via the CAN bus. Application of torque to the rear wheel is only allowed when the locking pin 26 is confirmed to be out, or the locking device OFF, for example by the sensors 38 and 42.

Figure 2:
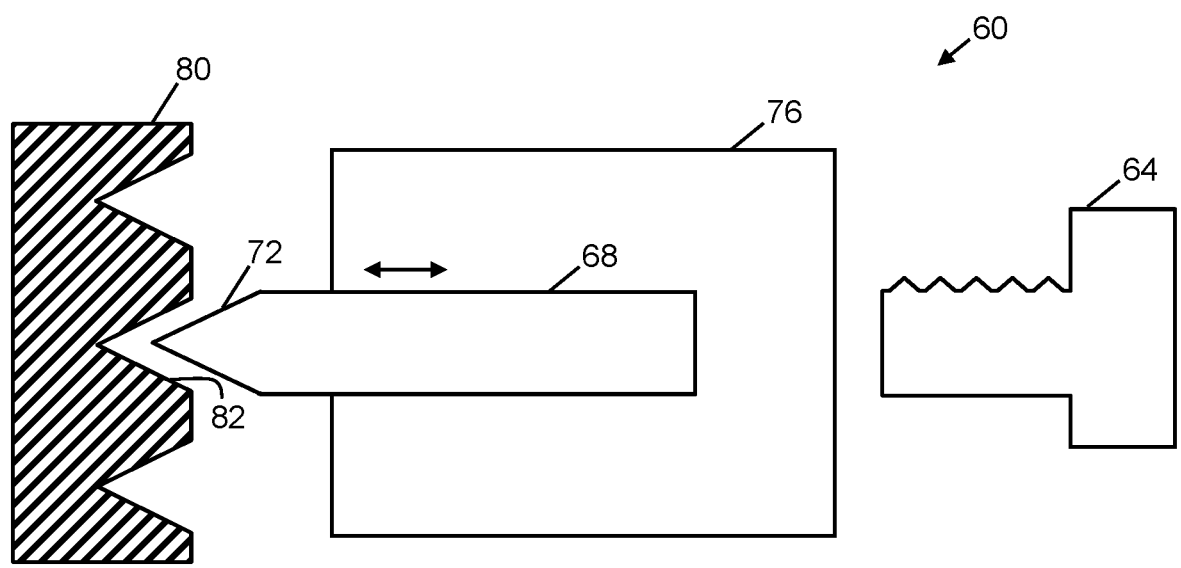
FIG. 2 is a schematic drawing of the locking device according to a manual embodiment of the present invention.

Referring to FIG. 2, a locking device 60 of the electric motorcycle, which may be activated manually, is shown. The locking device 60 is actuated by the use of a key 64. The locking pin 68 is a rod with a front extremity that ends with a tapered end 72. In some embodiments, the locking pin 68 terminates with a rounded head. The locking pin 68 may be made of aluminum, for example. The cylinder 76 represents the mechanical safety or locking component that locks the locking pin 68 in position. Instead of a servo motor actuating the locking pin 68 as in the preceding example, the key 64 actuates the locking cylinder 76 with a pin 68 that locks a rotating component 80 of the transmission or connected to the transmission without serving as a power transmission component. There is a possibility of automation or manual actuation of locking pin 68 into the recess 82 or slot, or automatic deactivation of the lock under certain conditions.

Figure 3:
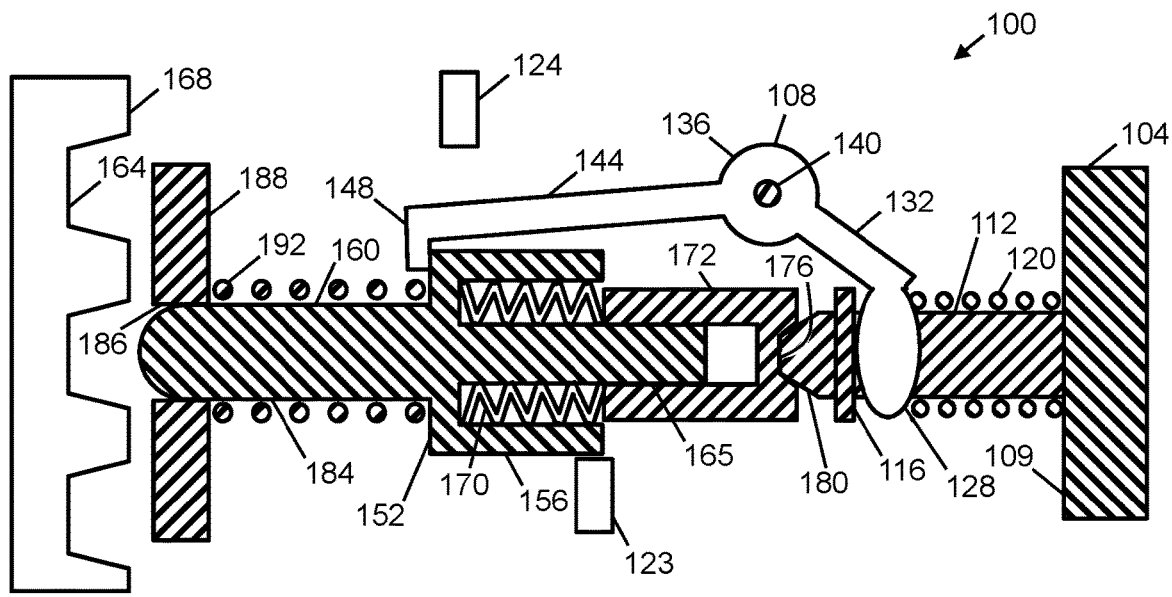
FIG. 3 is a detailed part-sectional drawing of the locking device in an unlocked position according to another embodiment of the present invention.

In some embodiments, it is desired to add a safety lock to the locking pin of the lock device, for keeping the locking pin in the OFF position for more safety. This is to reduce the risk that the locking pin becomes engaged when the motorcycle is moving. Referring to FIG. 3, a locking device 100 is shown in an unlocked configuration. The locking device 100 has an actuator 104, a latch 108 and a locking component 160 with a locking pin 184. The actuator 104 has a base 109, and an actuator pin 112 that has a shoulder 116. In some embodiments, the actuator 104 is a linear actuator model 7217 from Sonceboz. This model of the linear actuator 104 has a maximum force of 50 N, a maximum travel of 10 mm, a weight of 55 g and an increment step of 0.042 mm (24 steps/rev) or 0.021 mm (48 steps/rev).

A coil spring 120 is located around the actuator pin 112 of the actuator 104. When the locking device 100 is in an unlocked configuration, the actuator pin 112 is retracted. A pair of sensors 123, 124 are used to detect the positions of the locking component 160 and the latch 108 respectively of the locking device. Thus, the sensors 123, 124 transmit signals to the ECU, which in turn controls a warning or indicator light on the dashboard, and allows or prevents rotation of the drive motor.

A fork 128 of the latch 108 straddles the sides of the actuator pin 112 between the coil spring 120 and the shoulder 116 located at the front end of the actuator pin. In relation to this figure and the next, the front is at the left of the figures and the rear is at the right of the figures, and this bears no relation to the front and rear of the motorcycle. In the unlocked configuration, the coil spring 120 is in a compressed state between the fork 128 and the base 109 of the actuator. The role of the coil spring 120 is to maintain the fork 128 in contact with the shoulder 116 of the actuator pin, at least until the movement of the latch 108 is stopped by the sensor 124, for example, or another stop. In some embodiments, a different design for the fork 128 may be used. For example, a ring may be used in place of the fork 128, where the ring is welded on the rear arm 132 of the latch 108 and slides over the actuator pin 112 during movement.

The latch 108 has a bush 136 set on a pivot pin 140 and a front arm 144. The front arm 144 has a catch 148 projecting downwards at its front end. When the locking device 100 is in the retracted position, the catch 148 of the latch 108 is in contact with the top front end of the shoulder 152 of the body 156 of the locking component 160. Therefore, it prevents the locking pin 184 from engaging in the recess 164 on the reduction gear 168 of the transmission.

The body 156 of the locking component is a hollow cylinder open at its rear end. The body 156 of the locking component has a pin or rear pin 165 that extends from the inner side of its front, closed end towards the rear. A spring 170 is located around the rear pin 165 and inside the inner wall of the body 156. In this embodiment, the spring 170 is a disc spring. The body 156 and rear pin 165 engage with the hollow cylinder 172.

The hollow cylinder 172 has a recess 176 located on the outside of its base (or rear). The recess 176 is designed to host the tip or front end 180 of the actuator pin 112. Therefore, the shape of the recess 176 corresponds to the shape of the tip 180 of the actuator pin 112.

The body 156 is integral with or connected to locking pin 184 that extends from its front surface. The tip of the locking pin 184 is rounded and passes through a hole 186 defined in a fixed element or part 188 of the electric motorcycle (e.g. a guide or casing). A coil spring 192 is positioned around the locking pin 184, between the shoulder 152 of the body 156 and the fixed part 188 of the electric motorcycle.

Figure 4:
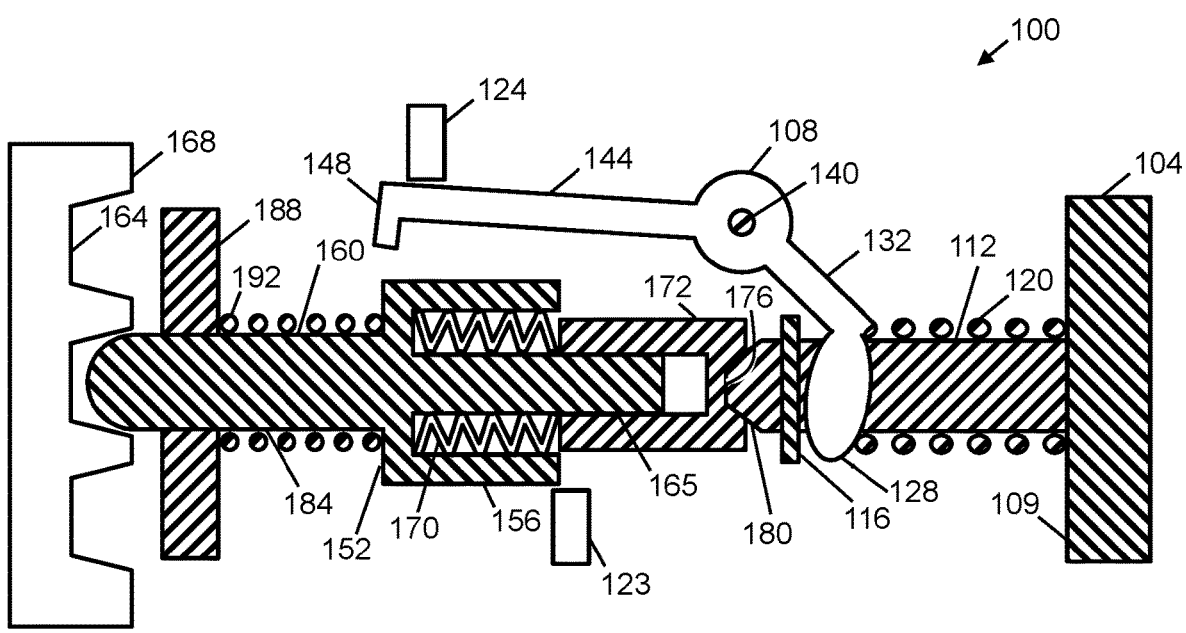
FIG. 4 is a detailed part-sectional drawing of the locking device of FIG. 3 in a locked position.

Referring to FIG. 4, the locking device 100 is shown in a locked configuration. The actuator 104 is in an extended configuration, which has allowed the forward movement of the fork 128 of the latch 108 due to the force of spring 120. When the actuator pin 112 extends, the fork 128 moves forward with the actuator pin while staying in contact with the shoulder 116 of the actuator pin, until the latch reaches a stop. The shoulder 116 may continue to move forwards after the latch 108 has stopped. The coil spring 120 around the actuator pin 112 extends and pushes forward the fork 128 that straddles the actuator pin.

During the actuator movement, the latch 108 rotates a small way around the pivot 140 in order to release the front catch 148 of the latch from the shoulder 152 of the body 156 of the locking component 160. Then, the locking pin 184 moves forward so that its front tip engages with a recess 164 in the reduction gear 168. The coil spring 192 around the locking pin 184 of the locking component 160 compresses between the fixed part 188 of the motorcycle and the shoulder 152 of the body 156 as the locking component 160 moves forward. The disc spring 170 compensates for tolerances and preloads the locking device 100 if the locking component 160 is activated when the tip of the locking pin 184 is between two recesses 164 on the reduction gear 168. If this occurs, the motorcycle may be jogged slightly back or forth to rotate the reduction gear slightly, which will be enough for the locking pin to engage.

The locking pin 184 remains in the locked position until manually or electro-mechanically released. When releasing the lock, the actuator pin 112 is retracted, which allows spring 192 to force the locking pin 184 out of the recess. Also, the shoulder 116 of the actuator pin 112 moves rearwards, contacting the fork 128 if not already in contact with it, rotating the latch 108 and bringing the catch 148 down over the shoulder 152 of the body 156 of the locking component 160. There is enough tolerance in the system for the locking pin 184 to retract far enough before the shoulder 116 on the actuator pin 112 forces the catch 148 down to retain the body 156 of the locking component 160. The actuator 104 and locking component 160 are configured so that the spring forces facilitate the retraction of the locking pin.

Figure 5:
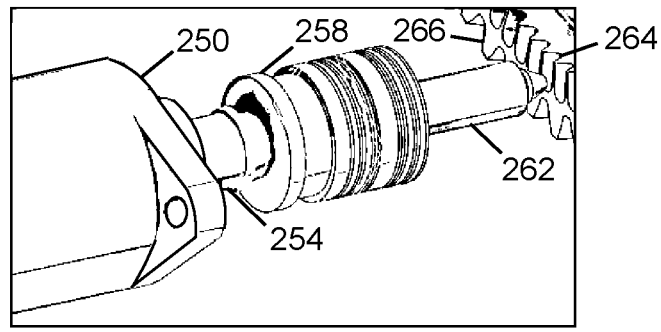
FIG. 5 is a drawing of the locking device in an unlocked position according to an embodiment of the present invention.

Referring to FIG. 5, a locking device is shown in an unlocked configuration. The locking device has an actuator 250 with an actuator pin 254. When the actuator pin 254 of the actuator moves forward, it pushes a body 258 of a locking component forwards. The body 258 has a locking pin 262 extending from its front portion that engages in one of the recesses 264 located on a reduction gear 266 of the transmission.

Figure 6:
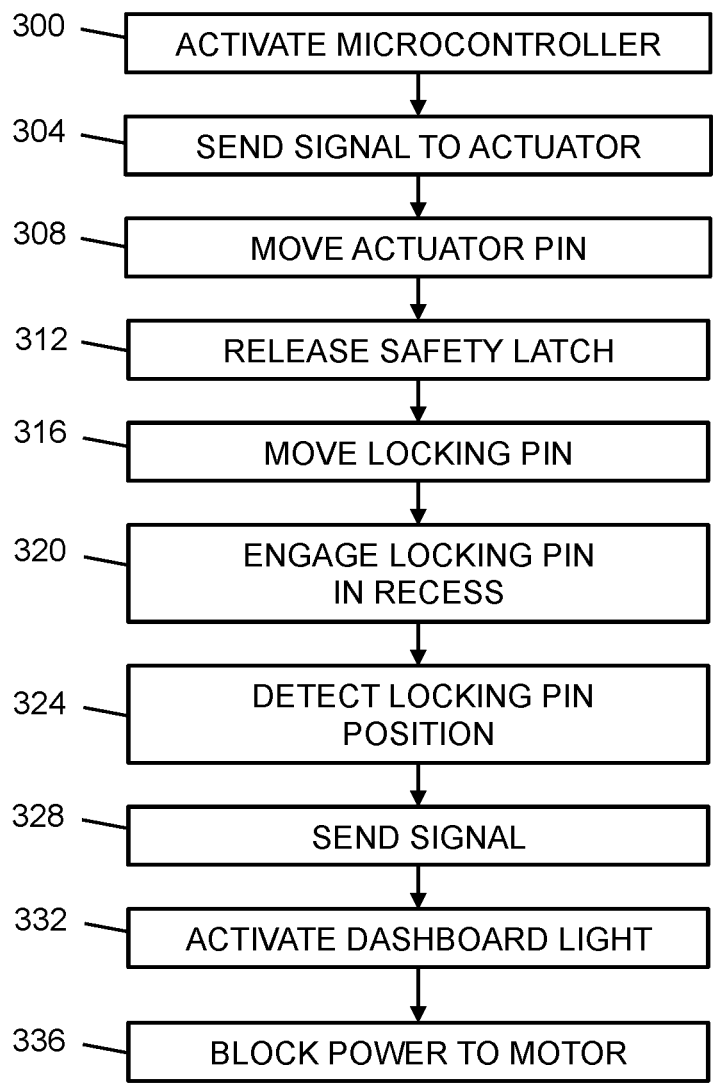
FIG. 6 is a high-level flowchart showing the key steps of operating the locking device in an electric motorcycle according to an embodiment of the present invention.

Referring to FIG. 6, a method is shown for applying the parking brake. In step 300, a microcontroller is activated by the user. The microcontroller may be part of the ECU or a separate component connected to the ECU. The activation of the microcontroller is achieved by the user pushing a dedicated button or otherwise operating a switch on the dashboard or other interface of the electric motorcycle. In some embodiments, the microcontroller may be activated by a remote device such as a radio frequency key or a personal mobile communication device. In step 304, the microcontroller sends a signal to the actuator of the locking device. In step 308, the actuator causes the movement of the actuator pin. In step 312, the movement of the actuator pin releases a safety latch from the locking device. Then, in step 316, a locking pin of the locking device moves through a hole located in a fixed part of the motorcycle. In step 320, the locking pin engages in a recess located on a reduction gear of the transmission. In step 324, the sensor detects the position of the locking pin in the locking device as engaged, which would be the case of normal operation. In other cases, if the locking pin is detected as not engaged, then it indicates a fault, and that one or more of the earlier steps have failed. If all is well, then, in step 328, the sensor sends a signal to the ECU of the electric motorcycle confirming that the locking pin is engaged. In step 332, the ECU of the electric motorcycle activates an indicator or warning light on the dashboard to indicate the current status of the locking device as ON. If the status is ON, then, additionally, power to the drive motor may be blocked in step 336.

Figure 7:
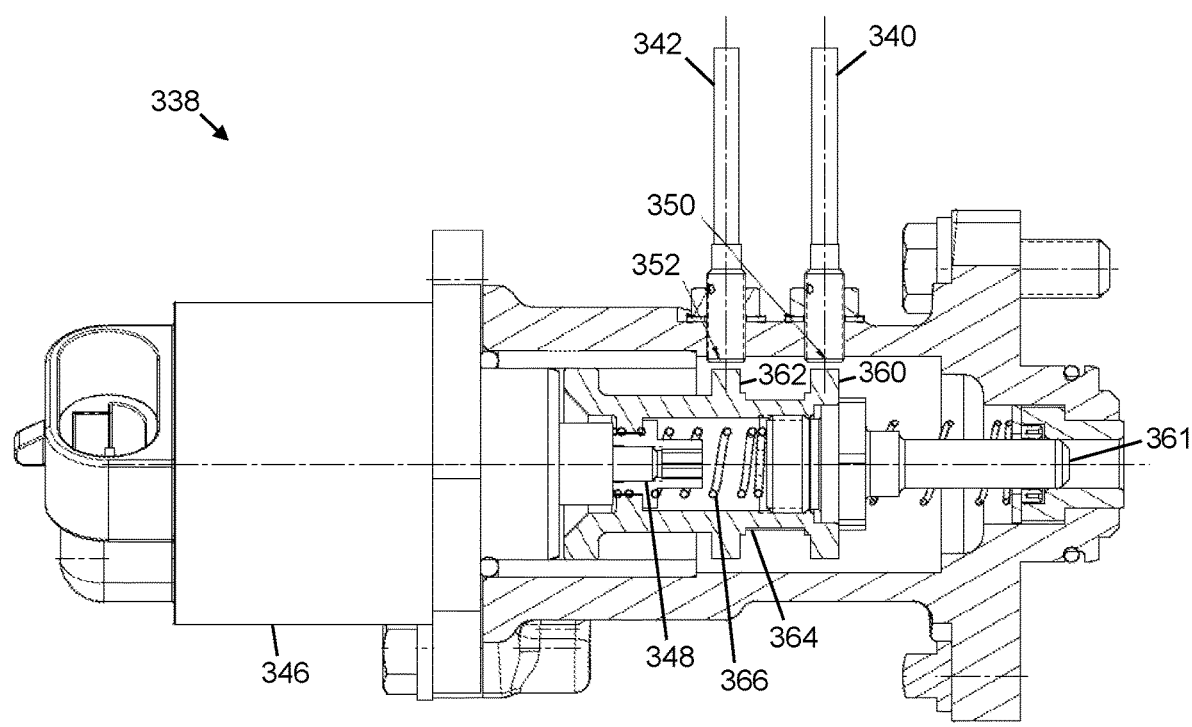
FIG. 7 is a cross-sectional view of a locking device, according to an embodiment of the present invention.

Referring to FIG. 7, a locking device 338 is shown with two inductive sensors 340, 342. Gaps 350, 352 are shown between the tips of the inductive sensors 340, 342 and projections 360, 362 on the locking component 364 of the locking device 338. The projections may cylindrical bands around the body of the locking component 364, for example. The actuator 346 activates an actuator pin 348 that moves locking component 364 to the right, which in turn moves the locking pin 361 to the right, advancing it out of the locking device 338 so that it engages with a locating feature in a rotatable component of a transmission. If the locking pin 361 is not lined up with a locating feature, then, when the actuator pin 348 advances, its movement is absorbed by the spring 366.

When the locking device 338 is switched off, i.e. the parking brake is off, then both sensors 340, 342 will show a signal indicating the presence of the locking component 364 in the retracted position, as shown in FIG. 7. When the locking device is on, i.e. when the parking brake is on, then only sensor 340 will provide a signal, indicating the presence of projection 362 in the engaged position of the locking component 364, i.e. when the locking component 384 has moved to the right to advance the pin 361 out of the locking device 338.

In situations where no signals are received from the sensors 340, 342, then this indicates that the locking component 364 and the locking pin 361 are between the retracted (off) and engaged (on) positions. This means that either the locking component 364 is in the process of moving or, if the locking component 364 is not moving, that the locking pin 361 is not locked into a locating feature of the rotatable component connected to the transmission because it is not sufficiently aligned to engage. In this latter case, the motorcycle will need to be jogged forward or backward a little to allow the pin to engage in a locating feature. The ECU can determine whether the locking component 364 is moving or not, by counting the steps taken by the stepper motor that advances the actuator pin 348. If the steps have not all been made, then this means that the locking component 364 is moving. If all the steps have been made and there are no signals from the sensors, then this means that the locking pin 361 is not engaged and that the motorcycle needs to be moved forward or backward a little. As soon as the locking pin 361 clicks into place in a locating feature on the rotatable component, then the sensor 340 detects that the locking component 364 is fully advanced, and sensor 342 continues to not detect anything (i.e. detects the absence of projection 362).

C. Variations

This invention can further act as a security device to meet the regulatory requirement of preventing unauthorized operation or movement of the motorcycle and thus replace the steering locks seen on many motorcycles, including internal combustion engine motorcycles. Furthermore, a mechanical key is not required.

While the locking features in the rotatable component connected to the transmission have been described as recesses, they may be referred to more generally as locating features. Locating features may include other types of locking features such as holes, slots, ridges, dimples, grooves, openings, gaps, spaces between protrusions, etc. In some embodiments, the locating features are, or are defined by, the teeth of the rotatable component, particularly where the rotatable component is a gear of the transmission such as a reduction gear. Each locating feature may be considered to be a space between two adjacent teeth of the reduction gear. Where the locating features are the gear teeth, there is no need to specially machine other locating features in the rotatable component.

An alternate mode would be to use other methods of actuation such as a manually actuated "over center" bar, hydraulics or pneumatics, a cam and motor, etc.

It is also possible in some embodiments to sense the position of the locking pin indirectly by the increase in current while compressing the spring. For example, this may be achieved using a current sensor. In a scenario where the locking pin reaches the front inductive sensor position but there is no increase in current from compressing the spring, it could be assumed that the locking pin was broken. Operation might not be allowed in this condition as possible metallic, foreign object debris on the motor would represent a serious safety risk of locking the gears.

Referring back to FIG. 1, the actuator 22 may be biased with a spring that retracts the pin from the recess 50. If the spring breaks, for example, the locking pin 26 may not move. In the worst-case scenario the sensor(s) would detect that the locking pin 26 is not in the unlocked configuration and the ECU 18 would cut the power for an emergency stop.

In general, unless otherwise indicated, singular elements may be in the plural and vice versa with no loss of generality.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification and drawings are to be regarded in an illustrative, rather than a restrictive, sense.

It will be clear to one having skill in the art that further variations to the specific details disclosed herein can be made, resulting in other embodiments that are within the scope of the invention disclosed. Steps in the flowchart may be performed in a different order, other steps may be added, or one or more may be removed without altering the main outcome of the process.

All parameters, dimensions, materials, quantities, orientations and configurations described herein are examples only, and may be changed depending on the specific embodiment. Accordingly, the scope of the invention is to be construed in accordance with the substance defined by the following claims.

The invention claimed is:

1. A system for immobilizing an electric motorcycle, comprising:
a rotatable component that is driven by a transmission of the electric motorcycle, the rotatable component having a plurality of locating features;
a pin that is movable from a first position in which the pin is disengaged from the locating features to a second position in which the pin is engaged with one of the locating features, thereby immobilizing the electric motorcycle; and
a latch that retains the pin in the first position when the pin is in the first position;
wherein:
the latch has a catch extending from a first arm and a fork extending from a second arm;
the latch is pivoted;
the catch hooks over a body of a locking component of which the pin is a part; and
the fork straddles an actuator pin that is positioned to move the locking component and pivot the latch.

2. The system of claim 1, wherein the pin is made of aluminum and has a tapered or domed end tip that engages with any one of the locating features.

3. The system of claim 1, comprising an actuator that moves the pin.

4. The system of claim 3, comprising an encoder that outputs a signal indicative of a position of the pin.

5. The system of claim 3, comprising a current sensor that outputs a signal indicative of a position of the pin.

6. The system of claim 1, wherein the rotatable component is a reduction gear or a shaft.

7. The system of claim 1, wherein the pin is made from a softer material than the rotatable component.

8. The system of claim 1, comprising one or more inductive sensors that detect when the pin is in the first position and when the pin is in the second position.

9. The system of claim 1, comprising one or more inductive sensors that detect when the pin is in the first position, when the pin is in the second position and when the pin is between the first and second positions.

10. The system of claim 1, comprising a key-operated mechanical device that moves the pin.

11. The system of claim 1, comprising:
the locking component;
a first spring that biases the pin towards the first position;
an actuator;

the actuator pin, operated by the actuator; and
a second spring positioned to allow relative motion between the locking component and the actuator pin;
wherein the latch is operated by the actuator and a third spring.

12. The system of claim 11, wherein:
the first spring is set between the body and a fixed element of the electric motorcycle;
the second spring is set between the body and the actuator pin; and
the third spring is set between the latch and a base of the actuator.

13. The system of claim 11, comprising:
a rear pin that extends from the body in an opposite direction to the pin, wherein the second spring is a disc spring located around the rear pin; and
a cylindrical component open at one end, located between the actuator pin and the locking component, wherein the actuator pin engages with a recess in a closed end of the cylindrical component.

14. The system of claim 1, comprising a display that indicates one or both of the first and second positions on a dashboard of the electric motorcycle.

15. The system of claim 1, wherein each of the locating features is formed by two adjacent teeth on the rotatable component.

16. A system for immobilizing an electric motorcycle, comprising:
a rotatable component that is driven by a transmission of the electric motorcycle, the rotatable component having a plurality of locating features;
a pin that is movable from a first position in which the pin is disengaged from the locating features to a second position in which the pin is engaged with one of the locating features, thereby immobilizing the electric motorcycle;
a locking component of which the pin is a part, the locking component comprising a body from which the pin extends;
a first spring that biases the pin towards the first position;
an actuator;
an actuator pin operated by the actuator;
a second spring positioned to allow relative motion between the locking component and the actuator pin; and
a latch that is operated by the actuator and a third spring and retains the pin in the first position when the pin is in the first position.

17. The system of claim 16, wherein:
the pin is made of aluminum and has a tapered or domed end tip that engages with any one of the locating features;
the rotatable component is a reduction gear or a shaft; or
the pin is made from a softer material than the rotatable component.

18. The system of claim 16, comprising:
an encoder that outputs a signal indicative of a position of the pin; or
a current sensor that outputs a different signal indicative of the position of the pin.

19. The system of claim 16, comprising one or more inductive sensors that detect:
when the pin is in the first position and when the pin is in the second position; or
when the pin is in the first position, when the pin is in the second position and when the pin is between the first and second positions.

20. The system of claim 16, comprising:
a key-operated mechanical device that moves the pin; and
a display that indicates one or both of the first and second positions on a dashboard of the electric motorcycle.

21. The system of claim 16, wherein:
the first spring is set between the body and a fixed element of the electric motorcycle;
the second spring is set between the body and the actuator pin; and
the third spring is set between the latch and a base of the actuator.

22. The system of claim 16, comprising:
a rear pin that extends from the body in an opposite direction to the pin, wherein the second spring is a disc spring located around the rear pin; and
a cylindrical component open at one end, located between the actuator pin and the locking component, wherein the actuator pin engages with a recess in a closed end of the cylindrical component.

23. The system of claim 16, wherein each of the locating features is formed by two adjacent teeth on the rotatable component.

* * * * *